United States Patent [19]

Beauch

[11] Patent Number: 5,115,691
[45] Date of Patent: May 26, 1992

[54] COLLAPSIBLE SHAFT ASSEMBLY

[75] Inventor: Howard D. Beauch, Frankenmuth, Mich.

[73] Assignee: General Motors Corporation, Detroit, Mich.

[21] Appl. No.: 752,346

[22] Filed: Sep. 3, 1991

[51] Int. Cl.$^5$ .............................................. B62D 1/18
[52] U.S. Cl. ..................................... 74/493; 74/492; 280/777; 464/162; 464/167
[58] Field of Search ................. 280/777; 464/162, 167; 74/492, 493

[56] References Cited

U.S. PATENT DOCUMENTS

| | | |
|---|---|---|
| 1,791,001 | 2/1931 | Rasmussen . |
| 2,371,330 | 3/1945 | Irstad ............... 464/167 X |
| 3,001,387 | 9/1961 | Schultz ................... 464/167 |
| 3,144,785 | 8/1964 | Steiner et al. ........................ 74/493 |
| 3,165,942 | 1/1965 | Steiner et al. ........................ 74/493 |
| 3,306,127 | 2/1967 | Rieger ..................... 74/493 |
| 3,491,614 | 1/1970 | Saunders et al. ...................... 74/493 |
| 3,580,101 | 5/1971 | Jorgensen ................... 74/493 |
| 4,106,311 | 8/1978 | Euler . |
| 4,796,481 | 1/1989 | Nolte ................................ 74/493 |

FOREIGN PATENT DOCUMENTS 2322066 11/1974 Fed. Rep. of Germany .

Primary Examiner—Rodney H. Bonck
Attorney, Agent, or Firm—Saul Schwartz

[57] ABSTRACT

A longitudinally collapsible shaft assembly particularly for application as a steering shaft in energy absorbing steering columns. The shaft assembly includes a first shaft element having a tube end, a second shaft element having a bar end in the tube end, and a coupling which connects the bar and tube ends for unitary rotation without restraining the shaft elements longitudinally relative to each other. The coupling includes diametrically opposite longitudinal slots in the tube end and two longitudinally spaced pairs of diametrically opposite rollers on the bar end which roll along the side edges of the slots to minimize friction during longitudinal collapse. for transferring torque between the tube and bar ends in one direction, one pair of diametrically opposite rollers engages one pair of diagonally opposite side edges of the longitudinal slots. For transferring torque between the tube and bar ends in the opposite direction, the other pair of diametrically opposite rollers engages the other pair of diagonally opposite side edges of the longitudinal slots.

4 Claims, 1 Drawing Sheet

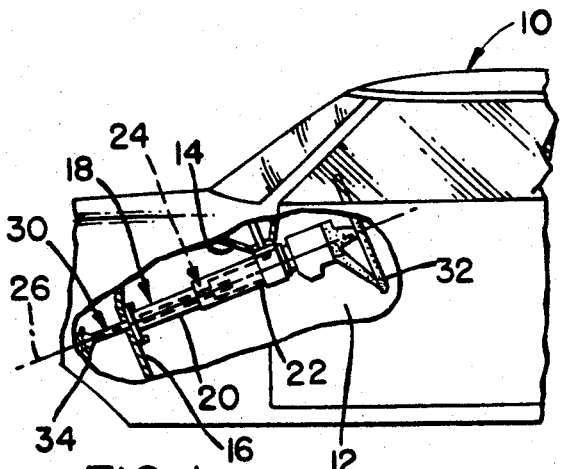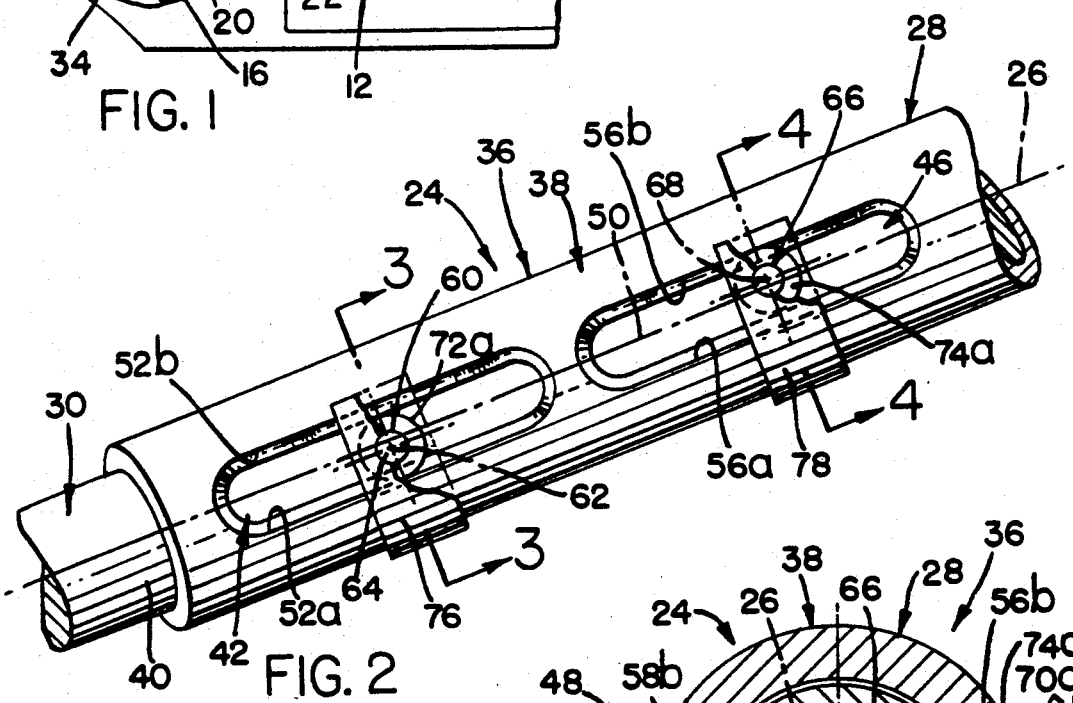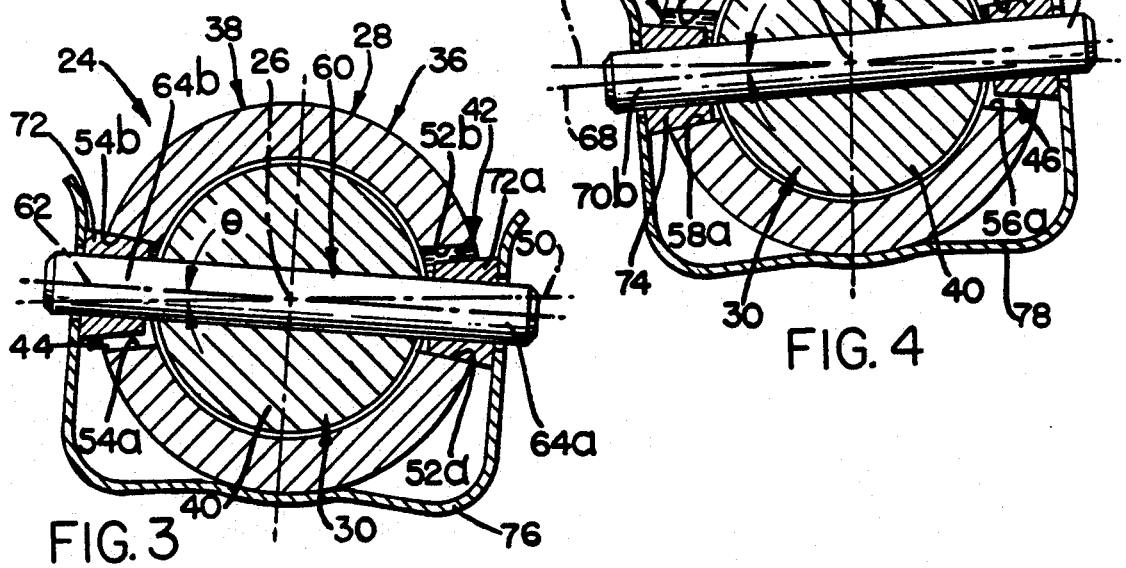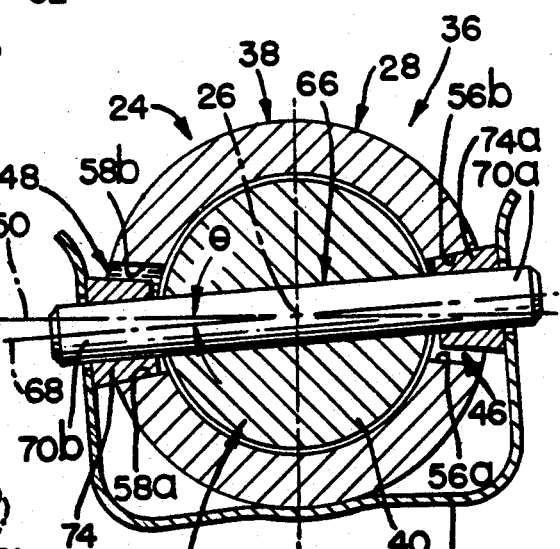

COLLAPSIBLE SHAFT ASSEMBLY

FIELD OF THE INVENTION

This invention relates to collapsible shaft assemblies suitable for application as steering shafts in energy absorbing automotive steering columns.

BACKGROUND OF THE INVENTION

Automotive steering columns typically include a mast jacket rigidly attached to the vehicle body, a steering shaft rotatably supported in the mast jacket, and a steering wheel on the upper end of the steering shaft. For absorbing energy, the mast jacket usually includes a lower section anchored to the body and an upper section releasably attached to the body such that compressive force on the steering wheel releases the upper section and initiates telescopic collapse thereof over the lower section. An energy absorbing medium, such as a roll deformer in an overlap between the upper and lower mast jacket sections, resists telescopic collapse at a predetermined rate. The steering shaft is not usually an energy absorbing unit of the steering column and, therefore, typically includes upper and lower elements interconnected by a coupling which joins the elements for unitary rotation without significantly restraining the shaft elements in the direction of the longitudinal centerline of the steering column. Commonly, such steering shaft couplings include a non-circular bar end on one shaft element received and slidable in a correspondingly non-circular tube end on the other shaft element. A shaft assembly according to this invention includes a coupling between upper and lower shaft elements exhibiting reduced friction during longitudinal collapse in comparison with the aforesaid sliding couplings and, therefore, is particularly suited for application as a steering shaft in an energy absorbing steering column.

SUMMARY OF THE INVENTION

This invention is a new and improved longitudinally collapsible shaft assembly including a first shaft element having a tube end, a second shaft element having a bar end disposed in the tube end, and a coupling between the tube and bar ends connecting the two for unitary rotation. The coupling includes diametrically opposite slots in the tube end having beveled side edges parallel to the centerline of the shaft assembly and two longitudinally spaced pairs of diametrically opposite trunnions on the bar end with tapered rollers thereon cooperating with the beveled side edges of the slots in defining a first lash-free connection for torque transfer in a first direction of rotation of the shaft assembly and a second lash-free connection for torque transfer in a second direction of rotation of the shaft assembly. During longitudinal collapse, the rollers roll along the corresponding side edges of the slots. The lash-free connections are effected by offsetting the trunnions relative to a longitudinal plane of the shaft assembly symmetric relative to the beveled side edges of the slots in the tube.

BRIEF DESCRIPTION OF THE DRAWINGS

FIG. 1 is a fragmentary partially broken-away view of an automobile body having a steering column including a shaft assembly according to this invention;

FIG. 2 is an enlarged view of a portion of FIG. 1 showing the shaft assembly according to this invention;

FIG. 3 is a sectional view taken generally along the plane indicated by lines 3—3 in FIG. 2; and FIG. 4 is sectional view taken generally along the plane indicated by lines 4—4 in FIG. 2.

DESCRIPTION OF A PREFERRED EMBODIMENT

Referring to FIG. 1, an automobile body 10 has a passenger compartment 12, an instrument panel support 14, and a forward wall 16. An energy absorbing, longitudinally collapsible steering column 18 in the passenger compartment includes a first or lower tubular mast jacket 20 anchored on the forward wall 16 and a second or upper tubular mast jacket 22 partially telescoped over the lower mast jacket and releasably connected to the instrument panel support 14. An energy absorbing medium, such as a roll deformer described in the U.S. Pat. No. 3,392,599, issued 16 July 1968 and assigned to the assignee of this invention, is disposed in the overlap between the mast jackets and deforms the mast jackets to absorb or dissipate energy when the upper mast jacket is forcibly telescoped further over the lower mast jacket.

Referring to FIGS. 1-2, a shaft assembly 24 according to this invention is supported within the upper and lower mast jackets 20-22 for rotation about a longitudinal centerline 26 of the steering column. The shaft assembly 24 includes a first or upper shaft element 28 and a second or lower shaft element 30. A steering wheel 32 is rigidly attached to the upper end of the upper shaft element 28. A flex coupling 34 is rigidly attached to the lower end of the lower shaft element 30 on the other side of the forward wall 16 from the lower mast jacket 20 and defines a conventional connection between the shaft assembly 24 and an input shaft, not shown, of a steering gear. A coupling 36 of the shaft assembly connects the upper and lower shaft elements.

As seen best in FIGS. 2-4, the coupling 36 includes a tube end 38 on the upper shaft element 28 telescoped over a bar end 40 on the lower shaft element 30. The tube end 38 has a first pair of diametrically opposite slots 42-44 parallel to the centerline 26 and a second pair of diametrically opposite slots 46-48 parallel to the centerline 26. Each of the slots 42-48 is symmetric with respect to a longitudinal plane 50, FIGS. 3-4, of the shaft assembly 24. Each of the slots 42,44,46,48 has a pair of outwardly beveled side edges 52a-b,54a-b,-56a-b,58a-b, respectively, spaced equally on opposite sides of the plane 50. The slots 42,46 and the slots 44,48 on corresponding sides of the tube end 38 are longitudinally aligned and may merge at their adjacent ends to define one pair of diametrically opposite long slots parallel to the centerline 26 and symmetric about the plane 50.

A first pin 60 pressed into a bore in the bar end 40 is aligned on a first transverse axis 62 of the bar end which intersects the centerline 26. The first pin projects from opposite ends of the bore in the bar end and defines a first pair of diametrically opposite trunnions 64a-b on the bar end between the side edges 52a-b,54a-b of the slots 42,44, respectively. A second pin 66 pressed into another bore in the bar end 40 is aligned on a second transverse axis 68 of the bar end longitudinally spaced from the first transverse axis 62 and likewise intersecting the centerline 26. The second pin projects from opposite ends of the corresponding bore in the bar end and defines a second pair of diametrically opposite trunnions 70a-b on the bar end between the side edges 56a-b,58a-b of the slots 46,48, respectively.

The first and second transverse axes are angularly offset on opposite sides of the plane 50 by a pair of equal angles e, FIGS. 3-4. When projected on a plane perpendicular to the centerline 26, the transverse axes intersect at the centerline 26 and define an "X" symmetric on opposite sides of the plane 50. Accordingly, the trunnions 64a-b in the first diametrically opposite pair are offset toward the diagonally opposite side edges 52a,54b of the slots 42,44 and the trunnions 70a-b in the second diametrically opposite pair are offset toward the diagonally opposite side edges 56b,58a of the slots 46,48.

Respective ones of a first pair of tapered rollers 72a-b are supported on the trunnions 64a-b for rotation about and for radial bodily shiftable movement in the direction of the first transverse axis 62. Similarly, respective ones of a second pair of tapered rollers 74a-b identical to the first pair are supported on the trunnions 70a-b for rotation about and for radial bodily shiftable movement in the direction of the second transverse axis 68. The cone angles of the rollers are calculated to effect line contact between the sides of the rollers and predetermined ones of the side edges of the slots 42-48.

A first C-shaped spring 76 envelops the tube end 38 and bears against the rollers 72a-b. A second C-shaped spring 78 envelops the tube end 38 and bears against the rollers 74a-b. The springs 76,78 bias the rollers 72a-b,-74a-b radially inward into engagement on predetermined ones of the side edges of the slots 42-48.

At assembly, the bar end 40 is inserted in the tube end 38 and rotated to register the transverse pin bores with the diametrically opposite pairs of slots 42-44 and 46-48 and the pins 60,66 are press fitted into the bores through the slots. The tapered rollers 72a-b,74a-b are fitted over the trunnions followed by the arms of the springs 76,78 which are spread apart until holes therein register with respective ones of the trunnions and then released. The springs bias the rollers radially inward into the slots.

As seen best in FIGS. 2-3, the rollers 72a-b of the first pair are offset toward the diagonally opposite side edges 52a,54b of the slots 42,44 and are resiliently biased against only those side edges so that a torque transferring, angular lash-free connection is effected between the bar end and the tube end in a first or clockwise direction of rotation of the shaft assembly. As seen best in FIGS. 2 and 4, the rollers 74a-b of the second pair are offset toward the diagonally opposite side edges 56b,58a of the slots 46,48 and are resiliently biased against only those side edges so that a torque transferring, angular lash-free connection is effected between the bar end and the tube end in a second or counter-clockwise direction of rotation of the shaft assembly. Accordingly, regardless of which direction a driver rotates the steering wheel 32, the shaft assembly 24 transfers steering torque from the steering wheel to the flex coupling 34 without angular lash.

In a collapse event of the steering column 18, the mast jackets 20,22 collapse in energy absorbing fashion and the tube end 38 of the shaft assembly 24 is forced further down over the bar end 40. The rollers 72a-b,74a-b roll against the side edges of the slots with which they are in contact for minimum frictional resistance to collapse. At the same time, because the transverse axes 62,68 define a symmetric "X" relative to the plane 50 and because the pins 60,66 are rigidly attached to the bar end 40, the four inwardly biased rollers 72a-b,74a-b operate to center the bar end in the tube end in the direction perpendicular to the plane 50. Accordingly, during a collapse event, the bar end is maintained as least partially centered in the tube end to further minimize surface contact and sliding friction.

The embodiments of the invention in which an exclusive property or privilege is claimed are defined as follows:

1. A collapsible shaft assembly comprising:
   a first shaft element having a tube end,
   a second shaft element aligned on a common longitudinal centerline with said first shaft element and having a bar end disposed in said tube end,
   first slot means on said tube end defining a first side edge and a second side edge each parallel to said longitudinal centerline and located symmetrically on opposite sides of a longitudinal reference plane containing said longitudinal centerline,
   second slot means on said tube end diametrically opposite said first slot means defining a first side edge and a second side edge each parallel to said longitudinal centerline and located symmetrically on opposite sides of said longitudinal reference plane,
   said first side edges of said first and said second slot means being diagonally opposite each other and said second side edges of said first and said second slot means being diagonally opposite each other,
   first roller means on said bar end bearing against said first side edge of said first slot means and said first side edge of said second slot means and defining an antifriction bearing for longitudinal collapse of said tube end relative to said bar end and an angularly lash-free connection between said tube end and said bar end in a first direction of rotation of said shaft assembly, and
   second roller means on said bar end spaced longitudinally from said first roller means bearing against said second side edge of said first slot means and said second side edge of said second slot means and defining an antifriction bearing for longitudinal collapse of said tube end relative to said bar end and an angularly lash-free connection between said tube end and said bar end in a second direction of rotation of said shaft assembly opposite said first direction of rotation.

2. The collapsible shaft assembly recited in claim 1 wherein
   each of said first and said second side edges of said first slot means and said each of said first and said second side edges of said second slot means is radially outwardly beveled,
   said first roller means includes a first pair of tapered rollers engaging in line contact respective ones of said first side edges of said first and said second slot means and supported on said bar end for rotation about and relative bodily movement along a first transverse axis of said bar end, and
   said second roller means includes a second pair of tapered rollers engaging in line contact respective ones of said second side edges of said first and said second slot means and supported on said bar end for rotation about and relative bodily movement along a second transverse axis of said bar end longitudinally spaced from said first transverse axis.

3. The collapsible shaft assembly recited in claim 2 and further including:
   a first spring means biasing said first pair of tapered rollers radially inward toward respective ones of said first side edges of said first and said second slot means, and a second spring means biasing said second pair of tapered rollers radially inward toward respective ones of said second side edges of said first and said second slot means.

4. The collapsible shaft assembly recited in claim 3 wherein
said first and said second transverse axes each intersect said longitudinal centerline and define a "X" when projected on a transverse reference plane perpendicular to said longitudinal centerline.

* * * * *